Aug. 16, 1938.  J. WAHL  2,126,845
TIRE VALVE
Filed Dec. 23, 1935
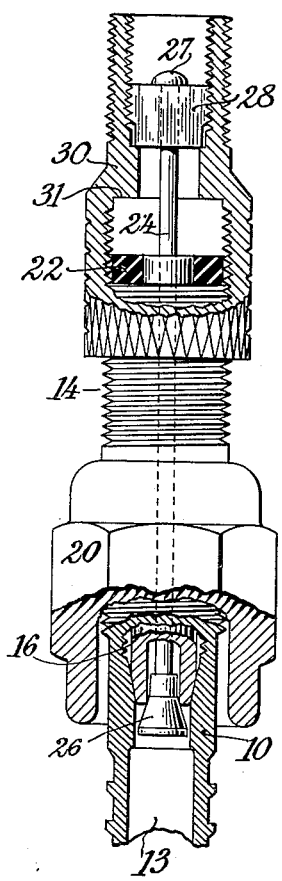
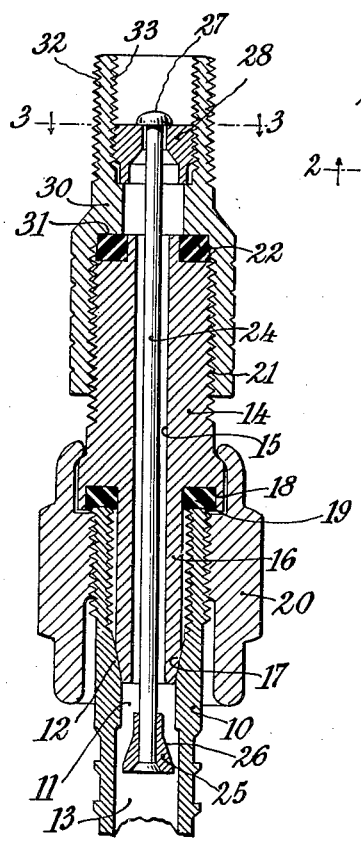
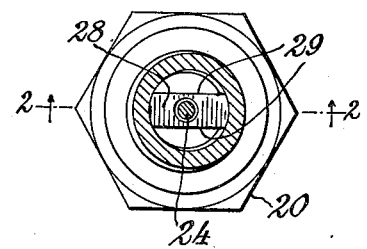
INVENTOR
John Wahl,
BY
Fraser, Myers Manley
ATTORNEYS.

Patented Aug. 16, 1938

2,126,845

UNITED STATES PATENT OFFICE 2,126,845

TIRE VALVE

John Wahl, Rosedale, N. Y., assignor to Scovill Manufacturing Company, Waterbury, Conn., a corporation of Connecticut Application December 23, 1935, Serial No. 55,740

2 Claims. (Cl. 251—139)

My present invention relates to pneumatic valves for tires and the like and aims to provide certain improvements therein.

The tire valves in almost universal use at present on the tires of automobiles, buses, motor trucks, etc., are of the type consisting of a valve stem or casing within which is removably mounted a valve core. This core usually comprises a plug provided with a rubber packing adapted to seat again an internal shoulder in the valve, and a check valve or plunger which is also provided with a rubber packing or disk which is held against a valve seat by a spring supplemented by the fluid pressure within the tire. Under normal conditions of use these valves have proven highly efficient and satisfactory. Under abnormal conditions, however, for example, where the location of the valve stem in proximity to the brake band of a wheel subjects the valve parts to high temperature, it has been found that the rubber packings under the influence of the heat tend to flow or thin out, thus giving rise to imperfect seals, with the consequent loss of air from the tires. Under conditions of continuous vibration this tendency toward leakage is aggravated. As a concomitant of these conditions the life of the tires which are thus caused to operate at less than prescribed pressures are materially shortened, thereby substantially decreasing the operating efficiency and increasing the operating cost of vehicles the tires of which are so affected.

According to my present invention I provide a tire valve for overcoming the deficiencies inherent in conventional tire valves when used under adverse operating conditions. This I accomplish by eliminating from the tire valve the rubber packings which are adversely affected by heat, and substituting in lieu thereof metal to metal seals which are adapted to be rendered fluid-tight by being manually tightened with the requisite amount of force. Moreover, I also preferably so construct the valve as to be usable with the conventional tire valve stems wherein the internal valve plug shoulder is relied upon to provide a metal to metal seal instead of a rubber to metal seal. I also construct the valve plunger so as to make a metal to metal seal with its seat.

The invention will be better understood from the detailed description which follows, when considered in conjunction with the accompanying drawing, wherein Figure 1 is an elevation of the tire valve embodying my invention, with parts broken away to show the internal construction thereof.

Fig. 2 is a longitudinal section through the valve shown in Fig. 1 with a valve check in unseated position, said section being taken substantially along the plane of the line 2—2 of Fig. 3.

Fig. 3 is a section taken substantially along the plane of the line 3—3 of Fig. 2.

Referring to the drawing, let the reference numeral 10 indicate the outer end part of a conventional tire valve casing which has a bore 11 therethrough of different diameters, which bore intermediate its ends and preferably in proximity to the outer or threaded nipple end of said casing, is formed with a tapered or conical shoulder 12 against which the packing on the plug element of a conventional tire valve core (not shown) is adapted to seat. Below the shoulder 12 the bore through the casing is somewhat constricted, and below said constricted portion is again enlarged to provide an enlarged valve plunger chamber 13. The tire valve casing 10 may be of any standard or preferred construction, and per se, does not constitute a part of the present invention.

The tire valve of the present invention is primarily in the form of a fitting intended for use in conjunction with a conventional tire valve casing from which the valve core has been removed. As herein shown, this tire valve fitting comprises a tubular element 14 having a body portion and a part 16 of reduced external diameter adapted to extend within a tire valve casing and said part 16 being formed at its free end with an inwardly tapered shoulder 17 of substantially complemental shape to the shoulder 12 and adapted to be seated thereagainst and held in contact therewith to provide a fluid-tight engagement between said shoulders. The tubular element has a bore 15 extending completely therethrough. At the shoulder formed by the reduced part 16 and the body proper said tubular element is formed with an annular recess 18 within which is held a compressible packing element 19 preferably formed of rubber composition, although other suitable packing material may be used. To hold the tubular element 14 in fluid-tight engagement with the tire valve casing the tubular element carries a coupling nut 20 adapted to screw-threadedly engage the external threads at the nipple end of the valve stem, the said coupling nut being swivelly mounted on the tubular element so as to facilitate the union between said parts without imposing a rotative strain upon the packing 19. The distance between the tapered shoulder 17 and the packing 19 is made substantially equal to the distance between the tapered shoulder 12 and the top of the tire valve casing 10 so that a metal to metal and a packing to metal seal will be substantially simultaneously made when the tubular element and the tire valve casing are coupled together. In this coupled relation the packing 19 in engagement with the end of the valve casing will serve as a sort of lock nut to prevent loosening of said coupled parts when subjected to vibration incident to rotation of the tire valve when mounted upon the wheel of a vehicle. The body of the tubular element is externally screw-threaded, as indicated at 21, and is formed at its outer end with an annular shoulder or rabbet upon which is seated a compressible packing washer 22.

Extending through the bore 15 of the tubular element 14 is a valve pin 24 formed of suitable metal, preferably stainless steel, to the inner end of which is riveted a valve plug element 25 which is preferably formed of a harder metal than that of the tubular element 14. The valve plug 25 has a substantially conical outer face 26, the smallest diameter of which is adapted to engage within the bore 15 of the tubular element and seat against the wall of said bore at the inner end thereof. The valve pin 24 at its outer end is formed with an enlarged head 27 and said pin has swivelly mounted thereon a screw-threaded plug 28 which has opposite flat faces 29 to provide engagement for a suitable tool for introducing it into its receiving member and for providing air passages, as will be presently described.

Screw-threadedly mounted on the body of the tubular element 14 is a sleeve or cap-like element 30 having a bore therethrough of various diameters and providing an internal shoulder 31 adapted to seat against the packing 22 and formed at its outer end with a nipple-like extension having external screw-threads 32 adapted to accommodate an ordinary valve cap or inflating nipple or chuck (not shown), and on its interior with screw-threads 33 for accommodating the screw plug 28. Rotation of the cap-like element 30 will operate to either draw the valve plug 25 outwardly, that is, into seating engagement with the inner end of the tubular element 14, or to permit said valve plug 25 to move inwardly, or, in other words, to unseat said valve plug.

In the use of my present invention the conventional valve core is first removed from the tire valve casing 10 and the tire valve assembly consisting of the parts 14, 20, 24 and 30, is then mounted over the nipple end of the valve casing by inserting the end 16 of the tubular element into the tire valve casing and rotating the swiveled nut 20 over the nipple of the valve casing to bring the tapered shoulders 12 and 17 into leak-tight engagement and simultaneously bring the packing 19 into leak-tight engagement with the end of the valve casing. The coupling nut 20 being formed with wrench-engaging surfaces, it will be apparent that a coupling force may be applied thereto sufficient to insure a perfect seating of the elements at the shoulders 12 and 17. Tests have shown that satisfactory air-tightness between the shoulders 12 and 17 can be accomplished with a torque of from 15 to 20 pound-inches. By rotating the cap element 30 in a counter-clockwise direction the valve plug 25 will be raised into seating engagement with the inner end of the tubular element 14, and inasmuch as the metal of the valve plug 25 is harder than that of the tubular element 14 the drawing up of the plug into the bore 15 will operate to somewhat expand the metal at the mouth of the bore as the cone advances thereinto. Experimental tests have shown that a satisfactory seat between the plug 25 and the end of the tubular element 14 will be obtained when the cap element 30 is tightened with a torque of from 10 to 15 pound-inches.

With a tire valve construction as hereinbefore described, the rapid destruction action of the conventional tire valve plug packing which normally seats against the shoulder 12 and the conventional packing washer in the valve plunger which usually manifests itself when subjected to temperature of from 300 to 400° F. is completely obviated. Moreover, steady vibration to which a valve stem upon a vehicle is subjected in use produces no loosening of the coupled parts, and this tightness may be ascribed to the metal to metal seal at the shoulders 12 and 17 and the substantial lock nut seal provided by the packing 19 at the end of the tire valve casing. It has also been found that repeated opening and closing of the valve will not adversely affect the leak-tightness of the seal because the valve 25 which is harder than its seat element will always produce a satisfactory flowing of the metal of the seat to insure leak-tightness.

From the foregoing detailed description it will be appreciated that I have provided a tire valve capable of overcoming the deficiencies inherent in conventional tire valves when used under conditions of heat and considerable vibration, and while I have shown and described but a single embodiment of my invention I do not wish to be limited to the details of construction disclosed, since it will be apparent to those skilled in the art that these may be varied without departing from the spirit of the invention as expressed in the appended claims.

What I claim is:

1. A tire valve or the like, comprising a metallic tubular element having at one end an externally tapered integral shoulder which is adapted to be seated in fluid-tight engagement against a complementally tapered shoulder within a tire valve casing, means on the tubular element for engaging a tire valve casing to effect the fluid-tight engagement between said shoulders, a valve pin extending through said tubular element and having at its inner end a metallic valve having a conical face of larger maximum diameter than the bore of the tubular element adapted to be drawn partly into the bore of the tubular element to seat against the inner end of the tubular element to provide a leak-tight seal between the parts, and a manually operable tubular carrier for said valve pin screw-threadedly engaging the tubular element adapted to effect the seating and unseating of the valve and through which carrier and tubular element fluid may pass when the valve is unseated.

2. A tire valve or the like, comprising a tubular metallic element having at one end an externally tapered shoulder which is adapted to be seated in fluid-tight engagement against a complementally tapered shoulder within a tire valve casing, means on the tubular element for engaging a tire casing to effect the fluid-tight engagement between said shoulders, a compressible packing carried by the tubular element for engaging the top of the tire valve casing and adapted to constitute locking means for preventing accidental disengagement between the tapered shoulders when they are held in engagement by the aforesaid means, a valve pin extending through said tubular element and having at its inner end a valve adapted to be seated against the inner end of the tubular element, and a manually operable tubular carrier for said valve pin screw-threadedly carried by the tubular element adapted to effect the seating of the valve and through which carrier and tubular element fluid may pass when the valve is unseated.

JOHN WAHL.